United States Patent
Faruque et al.

(10) Patent No.: US 12,187,218 B1
(45) Date of Patent: Jan. 7, 2025

(54) SEAT-MOUNTED OVERHEAD AIRBAG

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/344,068

(22) Filed: Jun. 29, 2023

(51) Int. Cl.
  *B60R 21/231* (2011.01)
  *B60R 21/207* (2006.01)
  *B60R 21/2338* (2011.01)

(52) U.S. Cl.
  CPC .... *B60R 21/231* (2013.01); *B60R 2021/2078* (2013.01); *B60R 2021/23153* (2013.01); *B60R 21/2338* (2013.01)

(58) Field of Classification Search
  CPC .......... B60R 2021/2078; B60R 21/231; B60R 21/232; B60R 2021/23161; B60R 2021/23146; B60R 2021/23153; B60R 21/2338
  See application file for complete search history.

(56) References Cited

U.S. PATENT DOCUMENTS

| | | | |
|---|---|---|---|
| 9,238,425 B2 | 1/2016 | Fukawatase | |
| 9,428,138 B2 | 8/2016 | Farooq et al. | |
| 11,312,326 B2 | 4/2022 | Oh et al. | |
| 11,351,946 B1 | 6/2022 | Faruque et al. | |
| 11,505,155 B1 | 11/2022 | Faruque et al. | |
| 11,603,070 B1 * | 3/2023 | Lozano Omana | B60R 21/207 |
| 2017/0136976 A1 * | 5/2017 | Ohno | B60N 2/888 |
| 2020/0094767 A1 * | 3/2020 | Kadam | B60R 21/203 |
| 2020/0114857 A1 * | 4/2020 | Jaradi | B60R 21/231 |
| 2021/0039578 A1 * | 2/2021 | Rupp | B60R 21/207 |
| 2022/0073025 A1 * | 3/2022 | Kang | B60R 21/23138 |

\* cited by examiner

*Primary Examiner* — Paul N Dickson
*Assistant Examiner* — Matthew D Lee
(74) *Attorney, Agent, or Firm* — Frank A. MacKenzie; Bejin Bieneman PLC

(57) ABSTRACT

A vehicle seat includes a vehicle seat having a seatback. An airbag is inflatable from an uninflated position to an inflated position. A linear actuator is fixed to the seatback and the airbag. The airbag is moveable by the linear actuator from an undeployed position upwardly away from the seatback to a deployed position. The linear actuator supports the airbag on the seatback in the uninflated position and in the inflated position.

20 Claims, 10 Drawing Sheets

SEAT-MOUNTED OVERHEAD AIRBAG

BACKGROUND

Vehicles are equipped with airbag assemblies that include an airbag and an inflator. In the event of certain vehicle impacts, the inflator activates and provides inflation medium to the airbag. This pressurizes the airbag to control the kinematics of an occupant during certain vehicle impacts. The airbag assemblies may be located at various positions in the passenger compartment of the vehicle. Vehicles may include airbags supported on a dash, side air curtains mounted to roof rails, seat-mounted airbag, etc.

DETAILED DESCRIPTION

Figure 1:
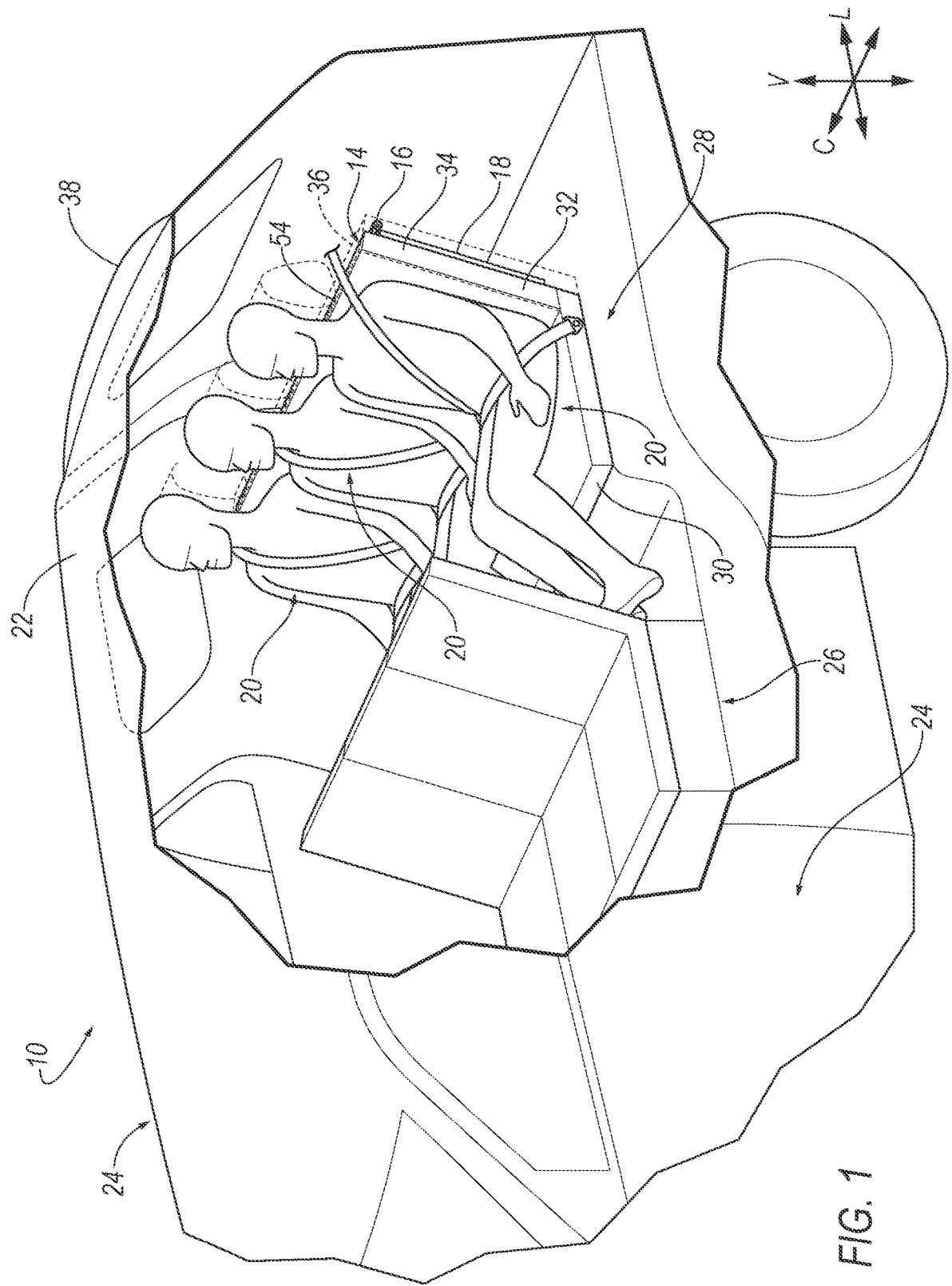
FIG. 1 is a cut-away view of a vehicle with a seat in a rear row with linear actuators in an undeployed position and an airbag in an uninflated position.

A vehicle seat includes a vehicle seat having a seatback. An airbag is inflatable from an uninflated position to an inflated position. A linear actuator is fixed to the seatback and the airbag. The airbag is moveable by the linear actuator from an undeployed position upwardly away from the seatback to a deployed position. The linear actuator supports the airbag on the seatback in the uninflated position and in the inflated position.

The linear actuator may include a base fixed to the seatback and a rod fixed to the airbag. The rod is slidably engaged with the base. The linear actuator may be pyrotechnically activated. One of the base and the rod may have a bore and the other of the base and the rod may be telescopically received in the bore.

The vehicle may include a second linear actuator spaced cross-vehicle from the linear actuator. The second linear actuator is fixed to the seatback and the airbag. The airbag is moveable by the second linear actuator from an undeployed position upwardly away from the seatback to a deployed position. The second linear actuator supports the airbag on the seatback in the uninflated position and in the inflated position. The vehicle seat includes a first occupant-seating area and a second occupant occupant-seating area. The first occupant-seating area and the second occupant-seating area may be between the linear actuator and the second linear actuator along a cross-vehicle axis.

The airbag may be at the seatback when the linear actuator is in the undeployed position and the airbag may be spaced above an uppermost end of the seatback when the linear actuator is in the deployed position.

The seat has an occupant-seating area and the airbag may have a top chamber inflatable over the occupant-seating area. The vehicle may include a liftgate and the top chamber may include a vehicle-rearward portion abutting the liftgate when the linear actuator is in the deployed position and the airbag is in the inflated position. The vehicle may include a tether fixed to the vehicle-rearward portion and connected to the seat. The vehicle may include a vehicle roof and the top chamber may include a vehicle-forward portion, the vehicle-forward portion extending downwardly and vehicle-forward from the vehicle-rearward portion to a forwardmost end spaced from the roof and vehicle-forward of the occupant-seating area. The vehicle may include a tether fixed to the vehicle-forward portion and connected to the seat. The vehicle may include a tether fixed to the vehicle-forward portion and connected to the seat and another tether fixed to the vehicle-rearward portion and connected to the seat. The vehicle may include a tether retractor fixed to the seat and operatively connected to the tethers to retract the tethers. The tether retractor may be pyrotechnically activated. The seatback may be between the vehicle-forward portion and the vehicle-rearward portion of the airbag in the inflated position. The airbag may include two side chambers inflatable downwardly from the top chamber on opposite sides of the occupant-seating area.

The vehicle may include an inflator fixed to the seatback and in fluid communication with the airbag.

The vehicle may include a fill tube from the inflator to the airbag.

With reference to the Figures, wherein like numerals indicate like parts throughout the several views, a vehicle 10 includes a vehicle seat 12 having a seatback 14. An airbag 16 is inflatable from an uninflated position to an inflated position. A linear actuator 18 is fixed to the seatback 14 and the airbag 16. The airbag 16 is moveable by the linear actuator 18 from an undeployed position upwardly away from the seatback 14 to a deployed position. The linear actuator 18 supports the airbag 16 on the seatback 14 in the uninflated position and in the inflated position.

In response to certain vehicle impacts, the linear actuator 18 moves the airbag 16 upwardly to the deployed position and the airbag 16 inflates, as shown in the example in the Figures. The linear actuators 18 position the airbag 16 for inflation and positioning relative to one or more occupant-seating areas 20 of the vehicle seat 12, as described further below.

With reference to FIG. 1, the vehicle 10 may be any suitable type of automobile, e.g., a passenger or commercial automobile such as a sedan, a coupe, a truck, a sport utility, a crossover, a van, a minivan, a taxi, a bus, etc.

The vehicle 10 includes a vehicle body. The vehicle body may be of a unibody construction, a body-on-frame construction, or any suitable construction. In the unibody construction, the vehicle body serves as a frame, and the vehicle body (includes the rockers, pillars, roof rails, etc.) is unitary, i.e., a continuous one-piece unit. As another example, in body-on-frame construction (also referred to as a cab-on-frame construction), the vehicle body and frame are separate components, i.e., are modular, and the vehicle body is supported on and affixed to the frame. In other examples, the vehicle body may have any suitable construction. The vehicle body may be of any suitable material, for example, steel, aluminum, etc.

The vehicle body includes a vehicle roof 22, vehicle pillars, body panels, a vehicle floor, etc. The vehicle body defines a passenger compartment 26 to house occupants, if any, of the vehicle 10. The passenger compartment 26 may extend across the vehicle 10, i.e., from one side to the other side of the vehicle 10. The passenger compartment 26 includes a front end and a rear end with the front end being in front of the rear end during forward movement of the vehicle 10.

With reference to FIG. 1, the vehicle 10 defines a vehicle-longitudinal axis L extending between a front end (not numbered) and a rear-end (not numbered) of the vehicle 10. The vehicle 10 defines a cross-vehicle axis C extending cross-vehicle from one side to the other side of the vehicle 10. The vehicle 10 defines a vertical axis V extending through a vehicle floor and the vehicle roof 22. The vehicle-longitudinal axis L, the cross-vehicle axis C, and the vertical axis V are perpendicular relative to each other.

The vehicle roof 22 and the vehicle floor are spaced from each other. Specifically, the vehicle floor is spaced below the vehicle roof 22. The vehicle roof 22 defines the upper boundary of the passenger compartment 26 and may extend from the front end of the passenger compartment 26 to the rear end of the passenger compartment 26. The vehicle roof 22 may include roof rails and a roof panel extending from one roof rail to the other roof rail. The roof panel may be irremovably fixed to the roof rails. In other words, the roof panel is secured to the roof rails in such a way that removal requires destruction such as cutting, e.g., cutting material and/or welded joints, etc. As an example, the roof panel may be attached to both roof rails, e.g., by welding, fasteners, etc.

The vehicle floor defines the lower boundary of the passenger compartment 26 and may extend from the front end of the passenger compartment 26 to the rear end of the passenger compartment 26. The vehicle floor may include upholstery, for example, carpet, and may have a class-A surface facing the passenger compartment 26, i.e., a surface specifically manufactured to have a high quality, finished, aesthetic appearance free of blemishes.

With reference to the Figures, the vehicle body includes a body side 24. Specifically, the vehicle body includes two body sides 24 spaced cross vehicle 10 from each other. The body side 24 is a side of the body located vehicle-outboard of the passenger compartment 26. The body sides 24 may be spaced from each other along the cross-vehicle axis A on opposite sides of the longitudinal axis L and may be elongated along the longitudinal axis L. The body side 24 includes one or more door openings. The vehicle floor extends from one body side 24 to the other body side 24 and the vehicle roof 22 extends from one body side 24 to the other body side 24. The body side 24 may include a rear-window opening adjacent a seatback 14 of rear one of the vehicle seats 12.

The vehicle body, specifically each body side 24, may include pillars. In some examples, the pillars on the same body side 24 are separated by one of the door openings. For example, the vehicle body may include a rear pillar on each side of the vehicle 10. The rear pillar may extend between the liftgate 38 and a rear door opening and other pillars may be vehicle-forward of the rear pillars, e.g., between adjacent doors. The vehicle 10 may include any suitable number of pillars on either body side 24. The pillars may extend from the vehicle roof 22 to the vehicle floor.

With reference to FIG. 1, the vehicle 10 includes vehicle doors, openable for occupants to enter and exit a passenger compartment 26. In the example shown in the Figures, the vehicle 10 includes a front door and a rear door on each body side 24. The front door is vehicle-forward of the rear door along the longitudinal axis L of the vehicle 10. Each door includes at least one door panel (not numbered) and the door-trim panel supported on the door panel. Specifically, the door may include two panels, namely a door inner (not numbered) and a door outer (not numbered). In such an example, the door-trim panel and the door outer are fixed to the door inner. The door-trim panel is positioned opposite the door outer. The door-trim panel is inboard relative to the door inner, and the door outer is outboard relative to the door inner. The door includes a window opening that may be completely closed by a window of the window is in a fully raised position. The door outer faces outboard relative to the vehicle 10. The door outer may define a portion of the exterior of the vehicle 10. For example, the door outer may present a class-A surface, i.e., a surface specifically manufactured to have a high-quality, finished aesthetic appearance free of blemishes. The door outer may be metal (such as steel, aluminum, etc.) or polymeric (such as fiber reinforced plastic composite, etc.). The door inner may be metal (such as steel, aluminum, etc.) or polymeric (such as fiber reinforced plastic composite, etc.). The door inner provides structural rigidity for the door outer. The door inner may provide a mounting location for components of the door. The door-trim panel may include a covering 36. The covering 36 may include upholstery, padding, etc. The upholstery may be cloth, leather, faux leather, or any other suitable material. The door-trim panel may be a material suitable for an interior of the vehicle 10, such as vinyl, plastic, leather, wood, etc.

The vehicle 10 may include one or more vehicle seats 12. Specifically, the vehicle 10 may include any suitable number of vehicle seats 12. The vehicle seats 12 are supported by the vehicle floor. The vehicle seats 12 may be arranged in any suitable arrangement in the passenger compartment 26. One or more of the vehicle seats 12 may be at the front end of the passenger compartment 26, e.g., a front row. One or more of the vehicle seats 12 may be behind the front end of the passenger compartment 26, e.g., at the rear end of the passenger compartment 26 as a rear row 28. In the example shown in the Figures, the vehicle 10 includes a rear row 28. The rear row 28 in the Figures may be, in some examples, a second row or a third row. The vehicle seats 12 may be of any suitable type, e.g., a bucket seat, bench seat, etc. The vehicle seats 12 may include seatbelts.

As set forth above, the seat includes the seatback 14 and the seat bottom 30. Specifically, the vehicle seat 12 of the rear row 28 shown in the Figures includes a seatback 14 and a seat bottom 30 elongated cross-vehicle and defining a plurality of occupant-seating areas 20, more specifically three occupant-seating areas 20 in the example shown in the Figures. In such an example, the seatback 14 and/or the seat bottom 30 may include separate foldable portions arranged cross-vehicle to allow for selective folding of portions of the seatback 14 in some examples. The vehicle seat 12 may include a head restraint at each occupant-seating area 20. The head restraint may be supported by and extends upwardly from the seatback 14. The head restraint may be stationary or selectively adjustable relative to the seatback 14 by an occupant.

The seatback 14 may be supported by the seat bottom 30 and may be foldable relative to the seat bottom 30 and/or reclinable relative to the seat bottom 30 or may be stationary relative to the seat bottom 30. The seatback 14 may extend from an upper end to a lower end. The lower end may be connected to the seat bottom 30. The upper end of the seatback 14 may be spaced upwardly from the lower end of the seatback 14, i.e., upwardly from the seat bottom 30. The head restraint may extend upwardly from the upper end of the seatback 14. The seatback 14, the seat bottom 30, and the head restraint may be adjustable in multiple degrees of freedom. Specifically, the seatback 14, the seat bottom 30, and the head restraint may themselves be adjustable. In other words, adjustable components within the seatback 14, the seat bottom 30, and the head restraint may be adjustable relative to each other.

The vehicle seat 12 includes a seat frame 32. The seat frame 32 includes a seatback frame 34 and the seat bottom 30 includes a seat bottom frame, i.e., the seatback 14 includes the seatback frame 34 and the seat bottom 30 includes the seat bottom frame. The seat frame 32 may include panels and/or may include tubes, beams, etc. The seat frame 32 may be of any suitable plastic material (e.g., carbon fiber reinforced plastic (CFRP), glass fiber-reinforced semi-finished thermoplastic composite (organosheet), etc.), a suitable metal (e.g., steel, aluminum, etc.), etc.

The vehicle seat 12 includes a covering 36 supported on the seat frame 32. The covering 36 may be cloth, leather, faux leather, or any other suitable material. The vehicle seat 12 may include padding material between the covering 36 and the seat frame 32. The padding material may be foam or any other suitable material. The covering 36 may be stitched in panels around the seat frame 32 and padding material. The covering 36 may include a tear seam (not numbered) associated with the airbag 16. The airbag 16 may extend through the tear seam as the linear actuator 18 moves from the undeployed position to the deployed position. The tear seam may be designed to tear apart when subjected to a tensile force above a threshold magnitude. In other words, the covering 36 on one side of the tear seam separates from the covering 36 on the other side of the tear seam when the force is above the threshold magnitude. The threshold magnitude may be chosen to be greater than forces from, e.g., inadvertent pushing against the seat by an occupant but be less than forces from the deployment of the airbag 16. The tear seam may be, for example, a line of perforations through the covering 36, a line of thinner covering material than the rest of the covering 36, etc.

The seatback 14 may define at least one occupant-seating area 20. The occupant seating-area is the space occupied by an occupant properly seated on the seat. The occupant-seating area 20 is vehicle-forward of the seatback 14 and above and vehicle-forward of the seat bottom 30. The portion of the occupant-seating area 20 that is vehicle-forward of the seat bottom 30 is the portion of the occupant-seating area 20 that is occupied by the knees of an occupant properly seated on the seat. In the example shown in the Figures, the seat of the rear row 28 includes three occupant-seating areas 20.

The body side 24 includes the door opening, as described above. The door opening may be between pillars and between a sill and the roof. In the example shown in the Figures, the body side 24 includes the front door opening and the rear door opening. The rear door opening is adjacent to the rear row 28. The door opening extends uninterrupted from one pillar to another pillar. The door opening extends uninterrupted from the vehicle floor to the vehicle roof 22. The door opening allows for ingress and egress into the passenger compartment 26. The vehicle 10 may include any suitable number of door openings to allow for ingress and egress into the passenger compartment 26. For example, the vehicle 10 may include one door opening on each side of the vehicle 10. In other examples, the vehicle 10 may include multiple door openings on each body side 24 of the vehicle 10.

The vehicle 10 includes a liftgate 38 supported by the vehicle roof 22. The liftgate 38 is openable at a rear of the vehicle 10 to provide access to the passenger compartment 26, e.g., to a cargo area of the passenger compartment 26. The liftgate 38 is movable between an open position allowing access to the cargo area and a closed position, shown for example in FIG. 1, inhibiting access to the cargo area and enclosing the passenger compartment 26. The liftgate 38 may pivot between the open position and the closed position. The liftgate 38 may include a window opening and a window disposed in the window opening. A hinge may connect the liftgate 38 to the vehicle roof 22, as described further below.

The liftgate 38 includes panels (not numbered), e.g., metal panels, and the hinge is connected to one of the panels. The liftgate 38 may include one or more trim panels (not numbered) supported on the panels of the liftgate 38. The trim panels face the passenger compartment 26 when the liftgate 38 is in the closed position. The trim panels in such an example, the trim panels may include upholstery, padding, etc., including cloth, leather, faux leather, vinyl, plastic, leather, wood, etc. Specifically, the vehicle body defines a liftgate 38 opening and the liftgate 38 is pivotable relative to the vehicle body between the closed position and the open position. The vehicle roof 22, body sides 24, and/or a rear bumper may define the liftgate 38 opening.

As set forth above, the liftgate 38 is adjacent to the vehicle roof 22. Specifically, the liftgate 38 is connected to the vehicle roof 22, e.g., pivotably connected. For example, as set forth above, the hinge connects the liftgate 38 to the vehicle roof 22. In the example shown in the Figures, the hinge is between the liftgate 38 and the vehicle roof 22 and pivotably connects the liftgate 38 and the vehicle roof 22. Specifically, the hinge is on the first end of the liftgate 38. Specifically, the hinge pivotably connects the first end of the liftgate 38 to the vehicle roof 22. The liftgate 38 pivots relative to the vehicle roof 22 from the closed position to the open position about the hinge. In the example shown in the Figures, the liftgate 38 is directly connected to the vehicle roof 22 by the hinge, i.e., the hinge is directly connected to the liftgate 38 and the vehicle roof 22 with no intermediate components therebetween. In other examples, intermediate components may be between the hinge and the liftgate 38 and/or between the hinge and the vehicle roof 22.

The liftgate 38 is vehicle-rearward of the seat of the rear row 28. In the example, shown in the Figures, the vehicle-forward edge of the liftgate 38 at the vehicle roof 22 is vehicle-rearward of the seat of the rear row 28. In other examples, the liftgate 38 may be above the seat of the rear row 28. In other words, in such an example, a vertical line from the seat extends through the liftgate 38 when the liftgate 38 is in the closed position.

The vehicle 10 includes an airbag assembly 40 including the airbag 16 and the linear actuator 18. In the example shown in the Figures, the airbag assembly 40 includes two linear actuators 18 spaced from each other cross-vehicle. In other examples, the airbag assembly 40 may include any suitable number of linear actuators 18, i.e., one or more. In the example shown in the Figures, the airbag assembly 40 is mounted to the seatback 14 of the seat of the rear row 28.

Figure 5:
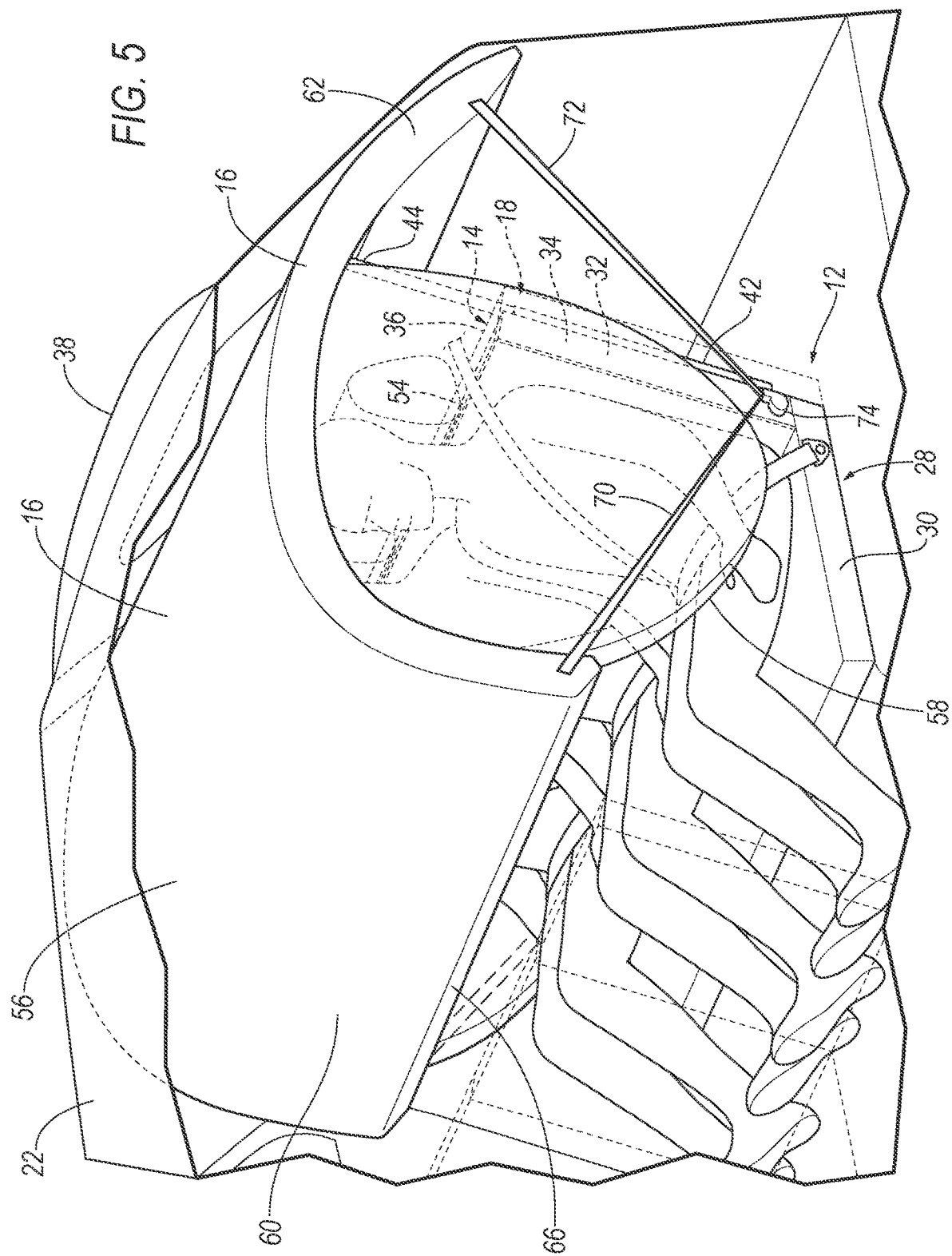
FIG. 5 is a cut-away view of the vehicle with the linear actuators in the deployed position and the airbag in an inflated position.
Figure 6:
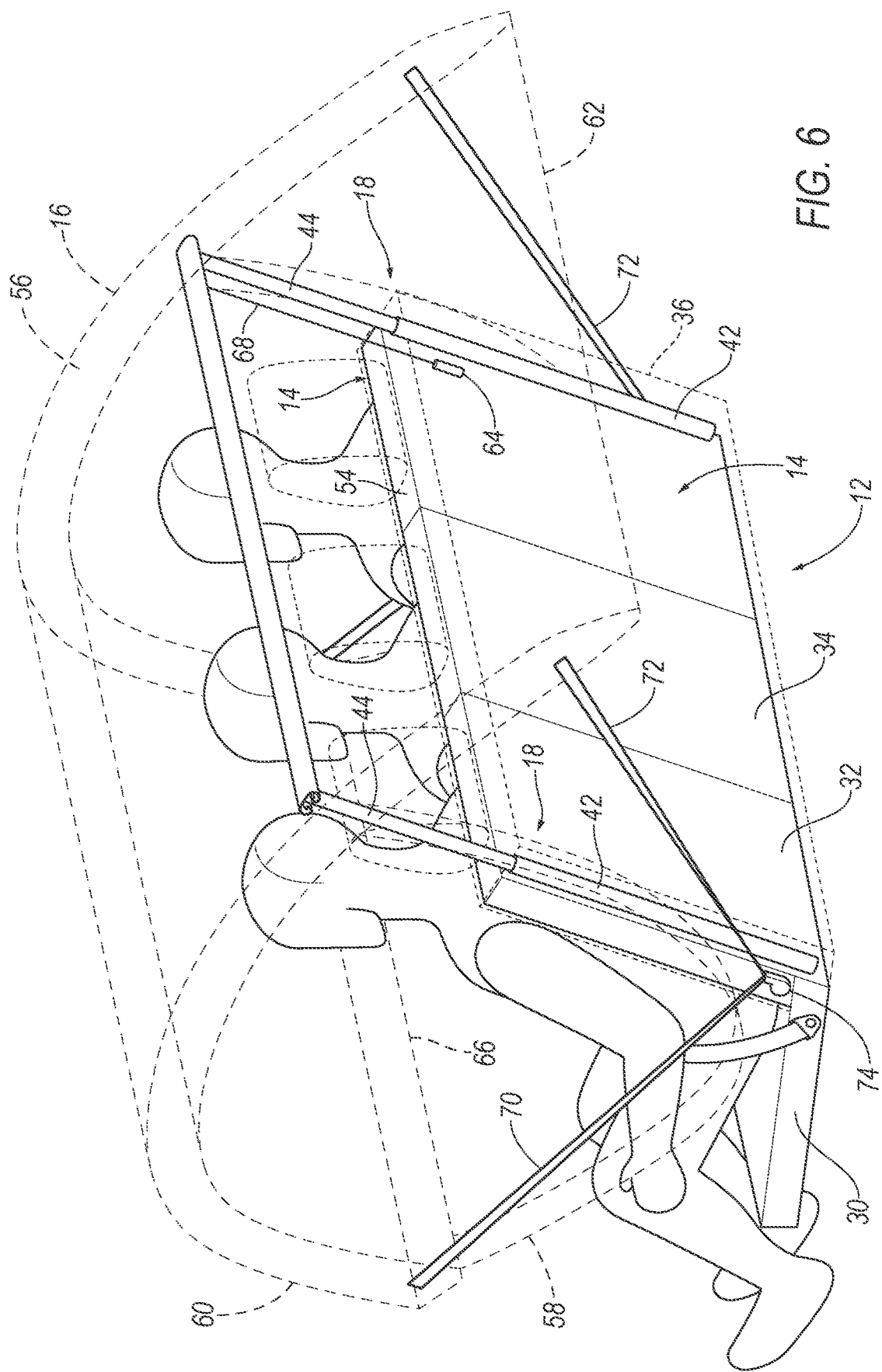
FIG. 6 is a rear perspective view of the seat with the linear actuators in the deployed position and the airbag in the inflated position.

The airbag 16 is inflatable from the uninflated position (FIGS. 1-5) to the inflated position (FIGS. 6-7). The airbag 16 is supported by the seatback 14 in the uninflated position and in the inflated position. In other words, the weight of the airbag 16 is borne by the seatback 14 in the uninflated position and the inflated position. Specifically, the airbag 16 is supported on the seatback 14 by the linear actuator 18. The weight of the airbag 16 is borne by the linear actuator 18 and the weight of the linear actuator 18 is borne by the seatback 14 when the airbag 16 is in the uninflated position and the inflated position, as described further below.

The airbag 16 is moveable by the linear actuator 18 from the undeployed position (FIGS. 1-2A) upwardly away from the seatback 14 to the deployed position (FIGS. 3-6). The linear actuator 18 in the deployed position positions the airbag 16 above the occupant-seating areas 20 of the seat of the rear row 28. As described below, the airbag 16 extends above, vehicle-forward, and vehicle-rearward of the seatback 14 when the linear actuator 18 is in the deployed position.

The linear actuator 18 is fixed to the seatback 14. A portion of the linear actuator 18 is anchored to and immoveable relative to the seatback 14. Specifically, in the example shown in the Figures, the linear actuator 18 includes a base 42 fixed to the seatback 14 and a rod 44 fixed to the airbag 16. The base 42 is immoveable relative to the seatback 14. As an example, the base 42 may be fixed to the seatback 14, e.g., the frame of the seatback 14 with, for example, threaded fasteners, welding, brackets, etc. The rod 44 is slidably engaged with the base 42. The rod 44 slides relative to the base 42 from the undeployed position to the deployed position.

Figure 2:
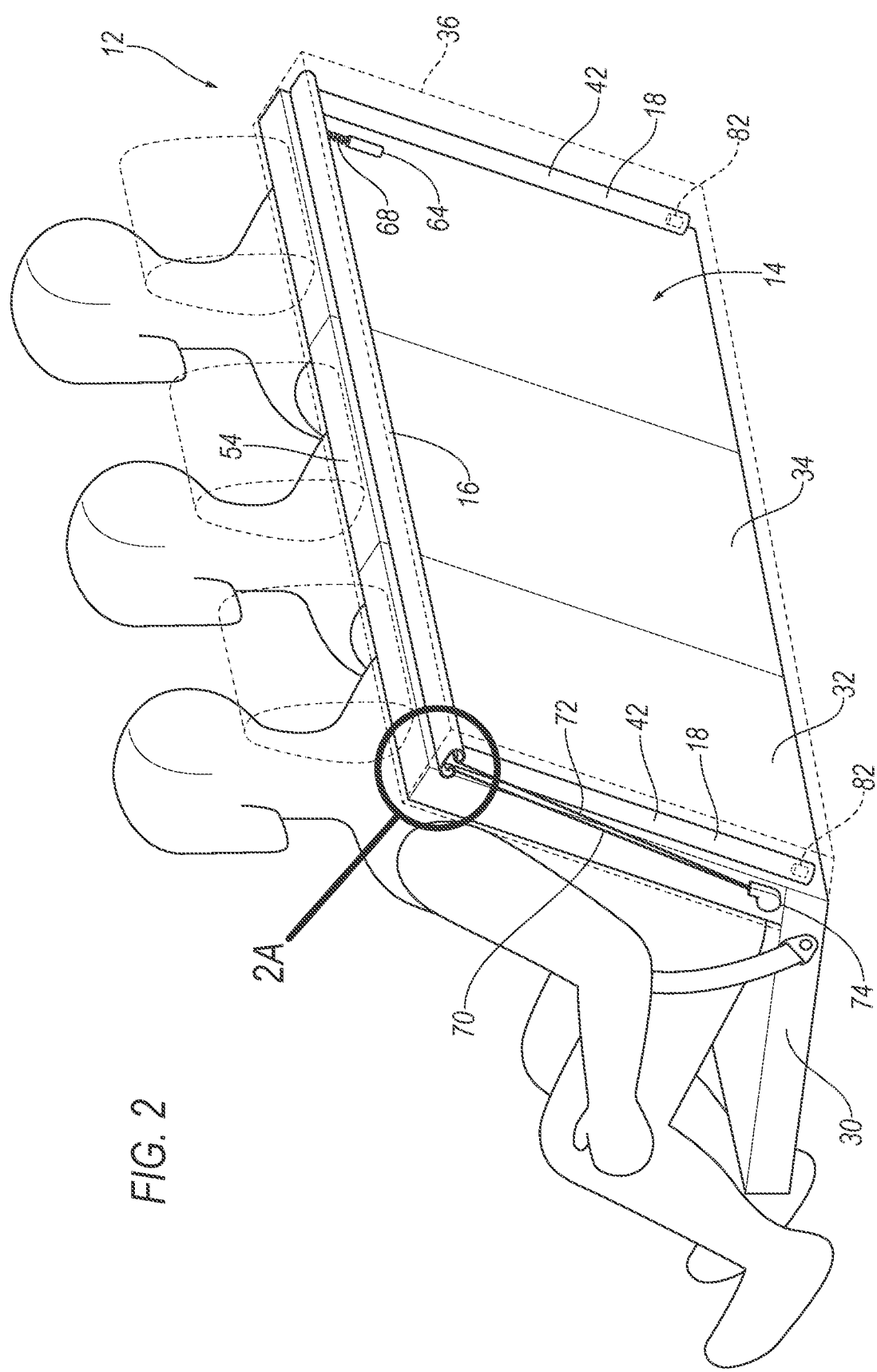
FIG. 2 is a rear perspective view of the seat of FIG. 1.
Figure 2A:
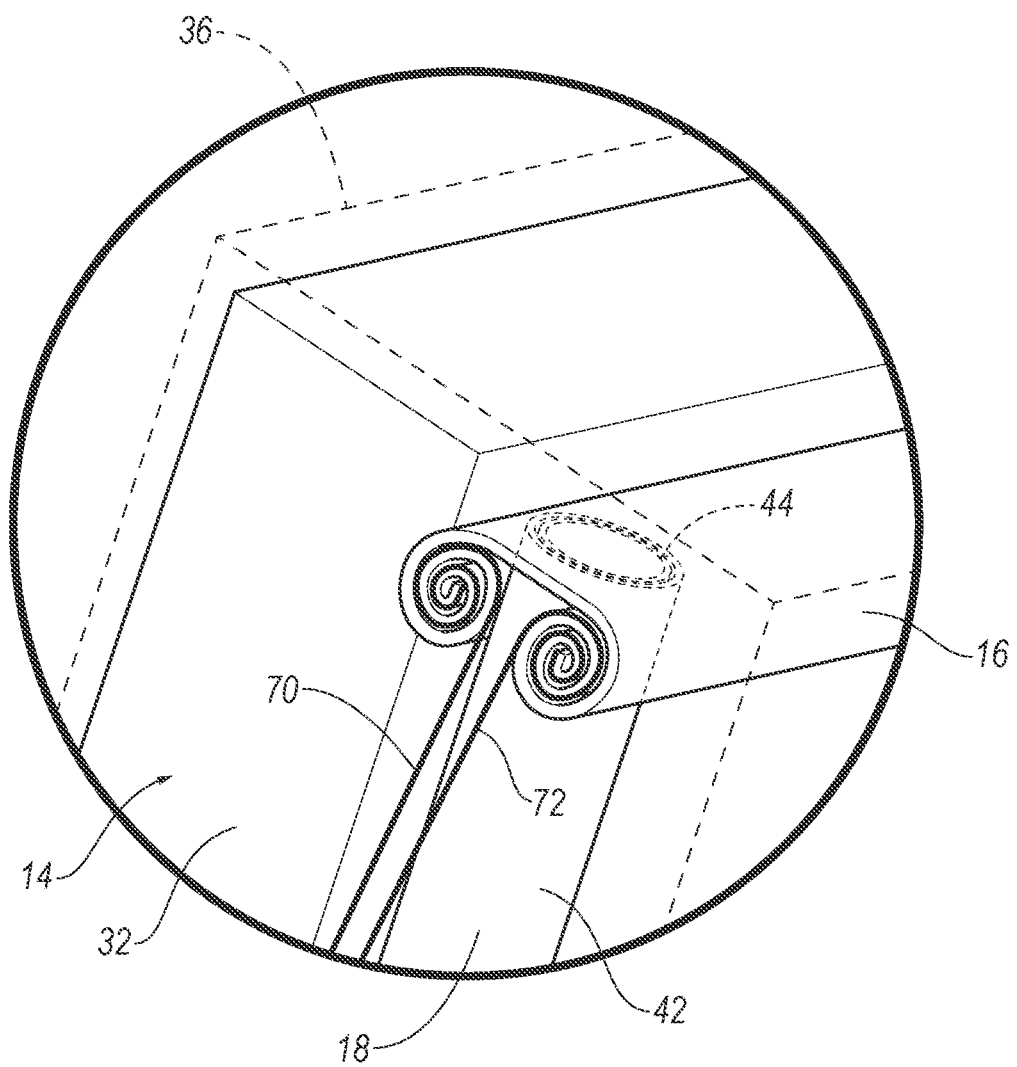
FIG. 2A is a magnified view of a portion of FIG. 2.
Figure 3:
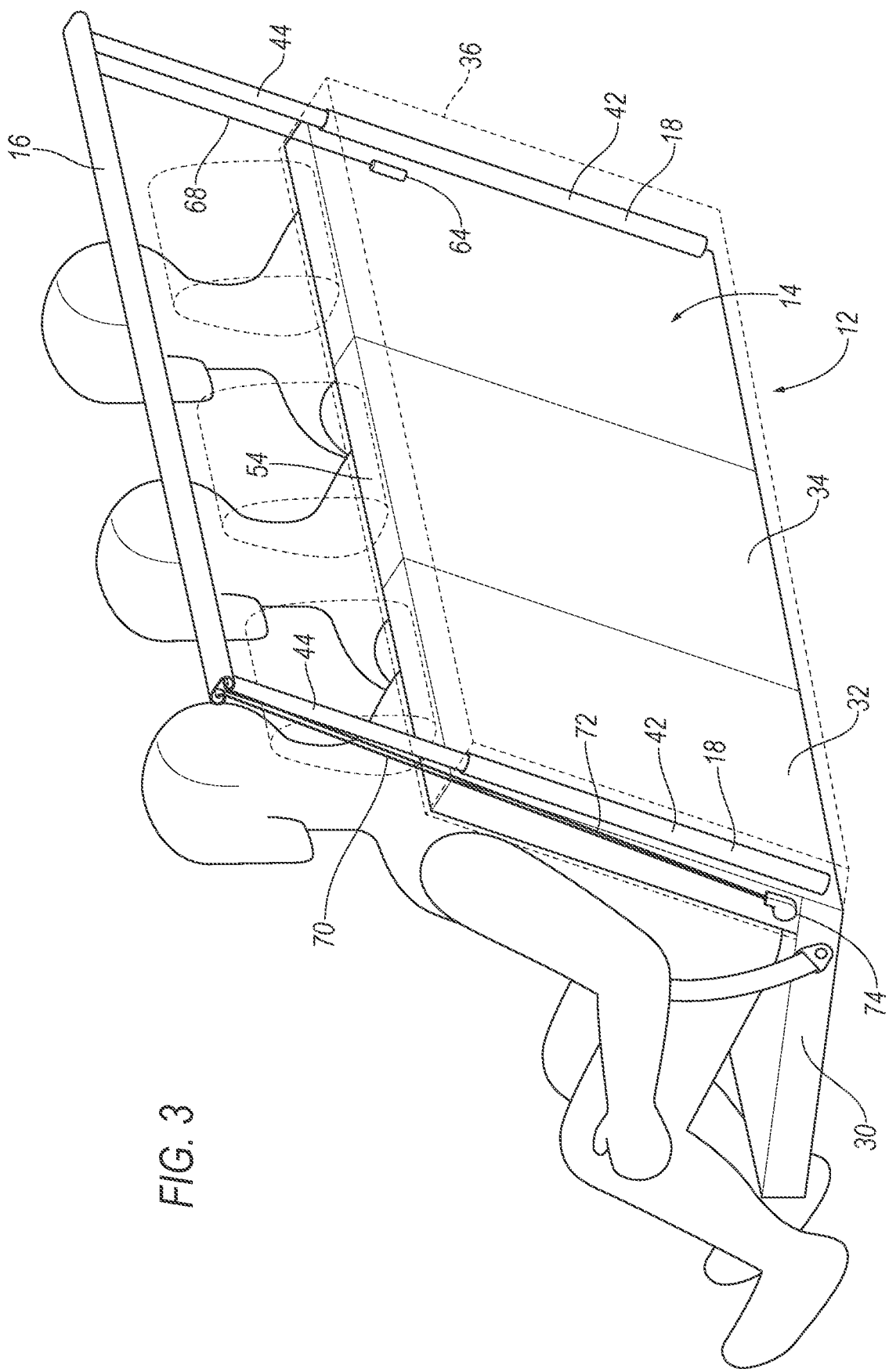
FIG. 3 is a rear perspective view of the seat with the linear actuators in a deployed position and the airbag in the uninflated position.
Figure 4:
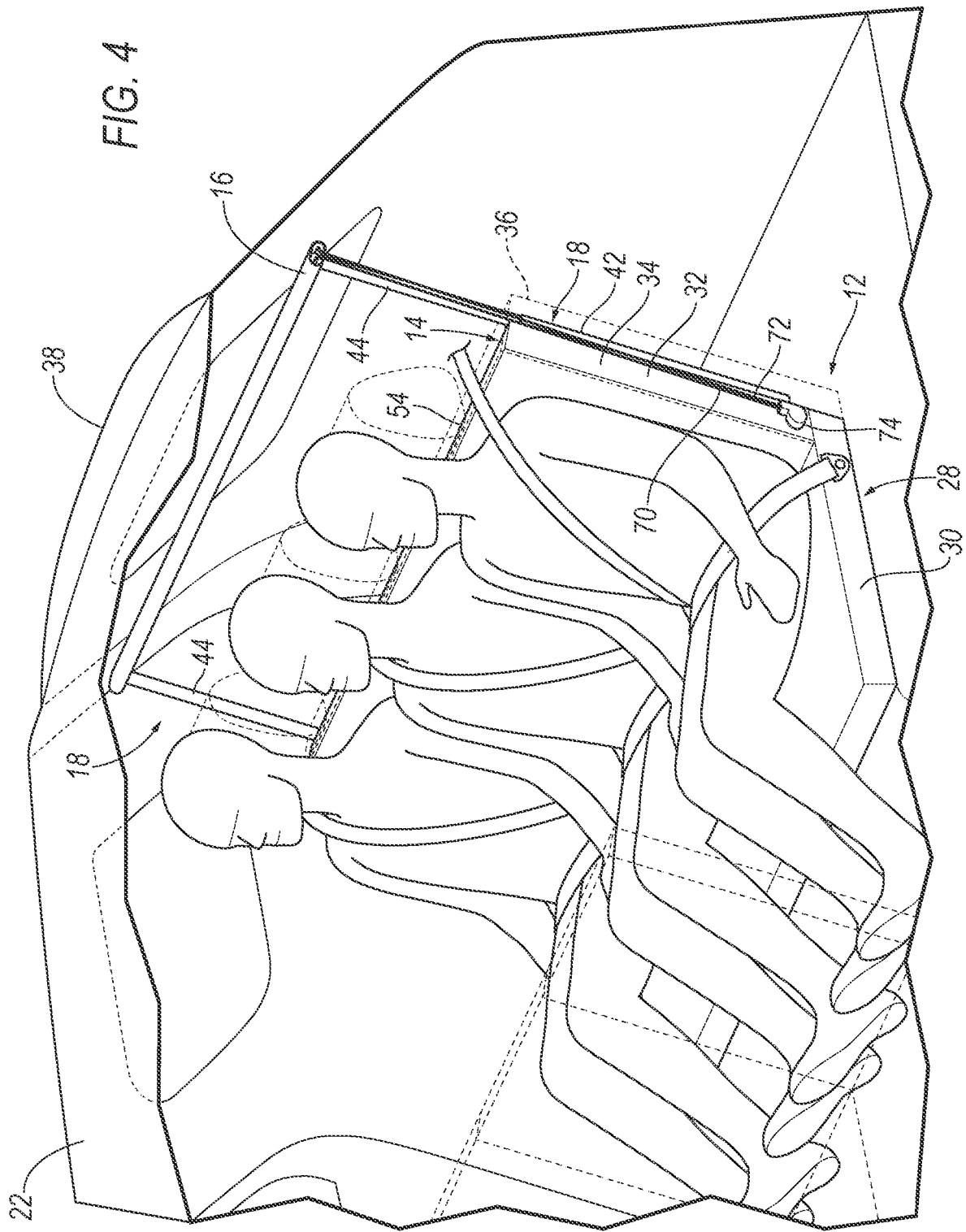
FIG. 4 is a cut-away view of the vehicle with the linear actuators in the deployed position and the airbag in the uninflated position.

The linear actuator 18 is fixed to the airbag 16. In the example shown in the Figures, the rod 44 of the linear actuator 18 is fixed to the airbag 16. The airbag 16 may be fixed to the rod 44 with, for example, adhesive, bonding, welding, threaded fastener, brackets, etc. As shown in FIG. 2A, the airbag 16 may be fixed directly to a top end of the rod 44. The airbag 16 moves with the rod 44 from the undeployed position to the deployed position and remains fixed to the rod 44 when the rod 44 is in the deployed position and the airbag 16 is in the inflated position.

The linear actuator 18 is pyrotechnically activated. For example, the base 42 and the rod 44 may telescopically extend relative to each other powered by a pyrotechnic charge. One of the base 42 and the rod 44 may have a bore and the other of the base 42 and the rod 44 is telescopically received in the bore. In the example shown in the Figures, the base 42 defines the bore and the rod 44 is slidably received in the base 42. The base 42, specifically, is tubular. The rod 44 telescopically extends from the base 42. The linear actuator 18 includes a pyrotechnic device 82 (shown schematically in FIG. 2) including a pyrotechnic charge between the base 42 the rod 44 to telescopically extend the base 42 and the rod 44 relative to each other. The pyrotechnic charge is combustible to produce a gas to telescope the base 42 and the rod 44, e.g., through extension of a piston activated by combustion of the pyrotechnic charge. The pyrotechnic charge may be formed of a solid mixture of substances that, when ignited, react to produce the gas. For example, the pyrotechnic charge may be formed of sodium azide (NaNO3), potassium nitrate (KNO3), and silicon dioxide (SiO2), which react to form nitrogen gas (N2). In the example shown in the Figures, the base 42 is fixed to the seatback 14 and the pyrotechnic device extends the rod 44 from the base 42.

Figure 7A:
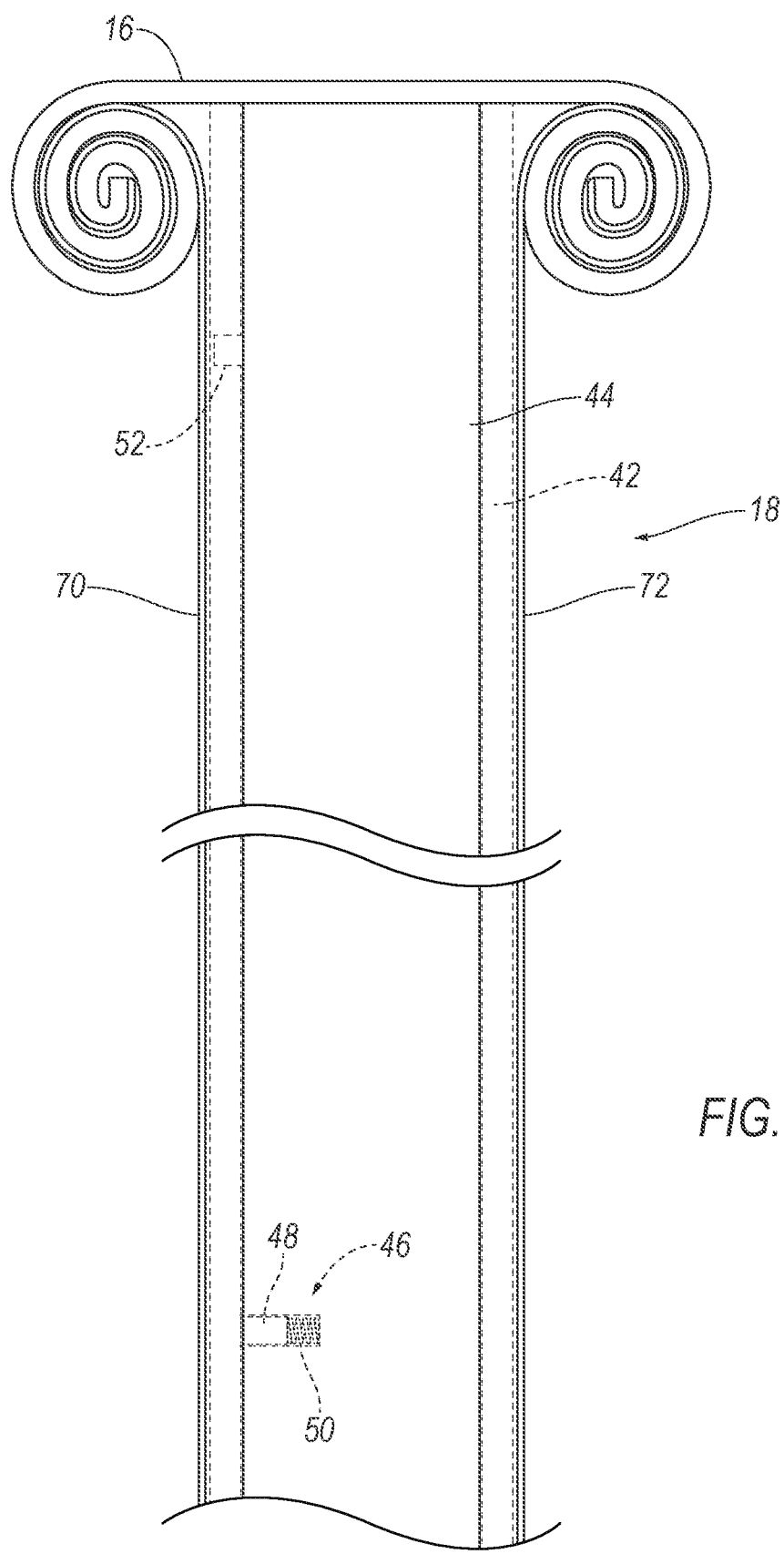
FIG. 7A is a side view of one of the linear actuators in the undeployed position.
Figure 7B:
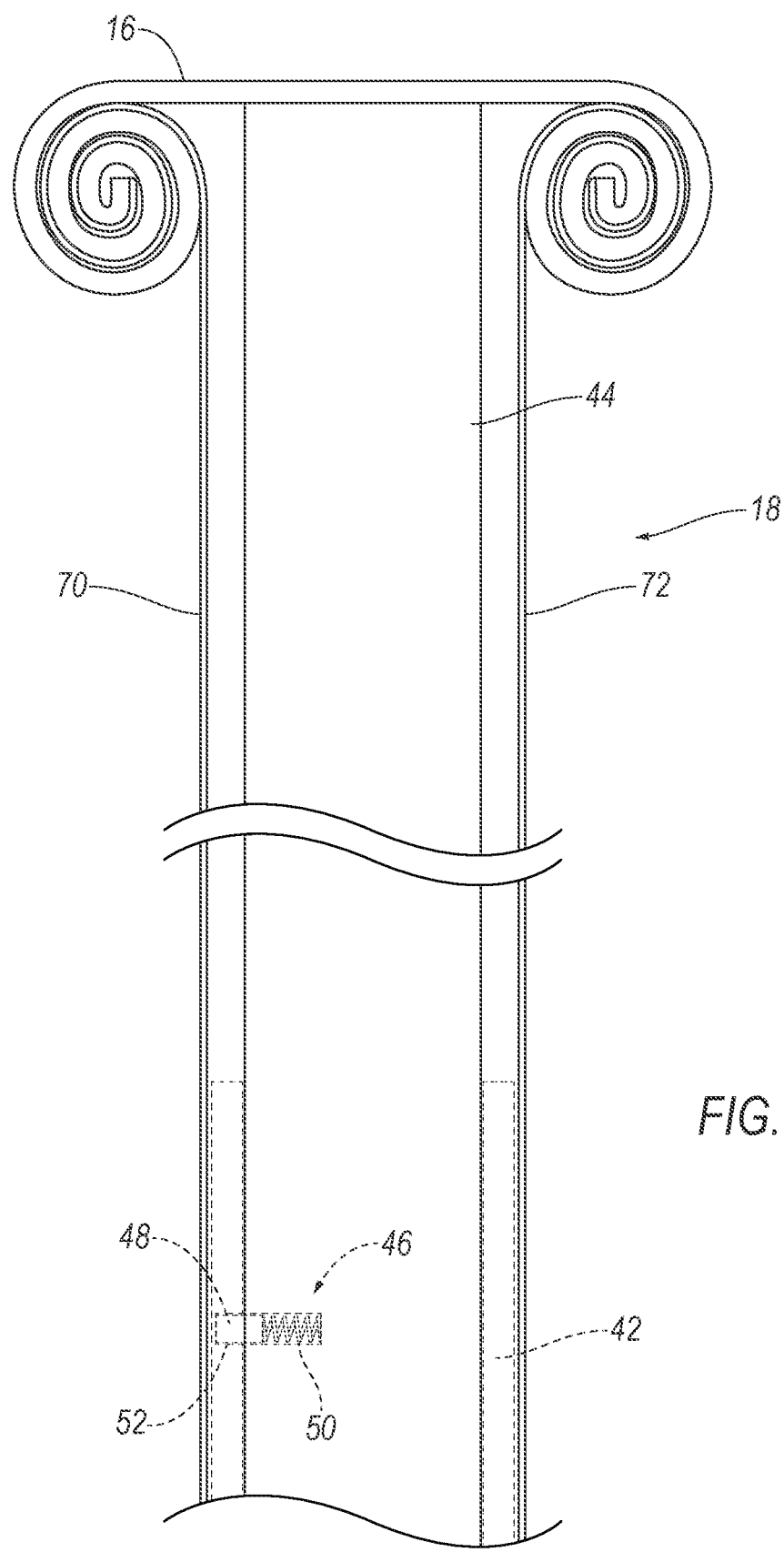
FIG. 7B is a side view of one of the linear actuators in the deployed position.

With reference to FIGS. 7A-B, the linear actuator 18 may include a lock 46 that locks the rod 44 relative to the base 42 in the deployed position. The lock 46 may be on one of the rod 44 and the base 42 and may engage the other of the rod 44 and the base 42. The lock 46 may travel with one of the rod 44 and the base 42 as the rod 44 and base 42 move relative to each other in the deployed position. In the example shown in FIGS. 7A-B, the lock 46 travels with the rod 44 relative to the base 42 from the undeployed position to the deployed position. The lock 46 in the example shown in FIGS. 7A-B includes a post 48 recessed in the rod 44 and a spring 50 biasing the post 48 toward the base 42. The base 42 includes a hole 52 that receives the post 48 when the rod 44 and the base 42 are in the deployed position. As the rod 44 moves relative to the post 48 to the deployed position, the post 48 reaches the hole 52 and the spring 50 biases the post 48 into the hole 52 to axially lock 46 the rod 44 relative to the base 42. This retains the rod 44 in the deployed position after the rod 44 reaches the deployed position. In other examples the lock 46 may be of any suitable type including other spring-loaded locks, surfaces of the rod 44 and base 42 that wedge against each other in the deployed position, active locks such as solenoids, etc.

As set forth above, the example shown in the Figures includes two linear actuators 18 spaced cross-vehicle from each other. In such an example, both linear actuators 18 are fixed to the seatback 14 and the airbag 16 and simultaneously move the airbag 16 from the undeployed position upwardly away from the seatback 14 to the deployed position. Both linear actuators 18 support the airbag 16 in the uninflated position and in the inflated position. Common numerals are used to identify the common features of the linear actuators 18.

In examples including two linear actuators 18, more than one occupant-seating area 20 of the seat, e.g., the seat of the rear row 28, may be between the two linear actuators 18 along the cross-vehicle axis C. In other words, when measured along the cross-vehicle axis C, the positions of the occupant-seating areas 20 along the cross-vehicle axis C are between the positions of the linear actuators 18 along the cross-vehicle axis. In such an example, the linear actuators 18 are vehicle-outboard of at least two of the occupant-seating areas 20. In the example shown in the Figures, all three of the occupant-seating areas 20 are between the two linear actuators 18.

In examples including two linear actuators 18, the airbag 16 extends from one of the linear actuators 18 to the other of the linear actuators 18 both when the linear actuators 18 are in the undeployed position and the deployed position and both when the airbag 16 is in the uninflated position and the inflated position. When the linear actuators 18 are in the undeployed position and the airbag 16 is in the uninflated position, the airbag 16 and/or the linear actuator 18 may be concealed, e.g., between the covering 36 of the seatback 14 and the frame of the seatback 14, as shown in FIGS. 1 and 2. As set forth above, the base 42 of the linear actuators 18 are fixed to the seatback 14, e.g., the seatback frame 34, and the airbag 16 is fixed to the rod 44 of the linear actuator 18 such that the linear actuator 18 supports the airbag 16 on the seatback 14 when the linear actuators 18 are in the undeployed position and the airbag 16 is in the in uninflated position. The airbag 16 is at the seatback 14 when the linear actuator 18 is in the undeployed position. As the linear actuator 18 moves from the undeployed position to the deployed position, the linear actuator 18 and the airbag 16 break through the covering 36 of the seatback 14, e.g., through the tear seam, and move upwardly above the seatback 14. The linear actuators 18 position the airbag 16 above the seatback 14 such that, as the airbag 16 inflates to the inflated position, the airbag 16 expands vehicle-forward of the occupant-seating area 20 and vehicle-rearward of the seatback 14, as described further below. When the airbag 16 is in the inflated position, the linear actuators 18 in the deployed position support the airbag 16 on the seatback 14 above the seatback 14. The airbag 16 is spaced above an uppermost end 54 of the seatback 14 when the linear actuator 18 is in the deployed position.

As shown in the example in the Figures, the airbag 16 in the inflated position includes a top chamber 56 and two side chambers 58. The top chamber 56 inflatable over the occupant-seating areas 20 of the seat of the rear row 28. The top chamber 56 includes a vehicle-rearward portion 60 and a vehicle-forward portion 62. In the example shown in the Figures, the airbag 16 may be rolled in uninflated position for packaging of the vehicle-rearward portion 60, vehicle-forward portion 62, and side chambers 58. In the examples shown in the Figures, at least the vehicle-rearward portion 60 and the vehicle-forward portion 62 are shown folded and similarly the side chambers 58 may be rolled. In the inflated position, the top chamber 56 and the side chambers 58 may share a common inflation chamber that is inflated by an inflator 64, as described further below.

The vehicle-rearward portion 60 abuts the liftgate 38 when the linear actuators 18 are in the deployed position and the airbag 16 is in the inflated position. The liftgate 38 operates as a reaction surface for the vehicle-rearward portion 60 in the inflated position. The vehicle-forward portion 62 of the airbag 16 in the inflated position is vehicle-forward of the occupant-seating areas 20 of the seat of the rear row 28. The vehicle-forward portion 62 extends downwardly and vehicle-forward from the vehicle-rearward portion 60 to a forwardmost end 66 spaced from the vehicle roof 22 and vehicle-forward of the occupant-seating areas 20. The seatback 14 is between the vehicle-forward portion 62 and the vehicle-rearward portion 60 of the airbag 16 in the inflated position and the occupant-seating areas 20 are between the vehicle-forward portion 62 and the seatback 14.

The two side chambers 58 inflatable downwardly from the top chamber 56 on opposite sides of the occupant-seating area 20. The side chambers 58 are vehicle-outboard of the occupant-seating areas 20. In the example shown in the Figures, the three occupant-seating areas 20 are between the two side chambers 58 in the inflated position. The side chambers 58 are between the body side 24 and the adjacent occupant-seating area 20.

The airbag 16 may be of any suitable airbag material, e.g., from a woven polymer. For example, the airbag 16 may be formed of woven nylon yarn, e.g., nylon 6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc. The airbag 16 may be a single continuous unit, e.g., a single piece of fabric. Alternatively, the airbag 16 may include a plurality of segments, i.e., two or more. The segments may be attached to each other in any suitable fashion, e.g., a plurality of panels attached by stitching, ultrasonic welding, etc.

The airbag assembly 40 includes at least one inflator 64 that inflates the airbag 16. The inflator 64 is fluidly connected to the airbag 16. The inflator 64 expands the airbag 16 with inflation medium, such as a gas, to move the airbag 16 from the uninflated position to the inflated position. The inflator 64 may be, for example, a pyrotechnic inflator that ignites a chemical reaction to generate the inflation medium, a stored gas inflator that releases e.g., by a pyrotechnic valve stored gas as the inflation medium, or a hybrid.

The inflator 64 may be supported by any suitable component of the vehicle 10. In the example shown in the Figures, the inflator 64 is fixed to the seatback 14 and is in fluid communication with the airbag 16. In such an example, the inflator 64 is connected to the airbag 16 with a fill tube 68. The fill tube 68 may be coiled, as shown in FIG. 2, to allow for the upward movement of the airbag 16 by the linear actuators 18 The inflator 64 may be fixed to the seatback 14, e.g., the seatback frame 34, in any suitable way, e.g., threaded fastener, bracket, etc.

The airbag assembly 40 may include tethers 70, 72 for positioning the airbag 16 in the inflated position. For example, the tethers 70, 72 may extend from the airbag 16 to the seat and may be anchored to the vehicle seat 12, e.g., anchored to the seat frame 32. In the example shown in the Figures, a tether retractor 74 anchors the tethers 70, 72 to the seatback frame 34, as described further below. The tethers 70, 72 may be fixed to the airbag 16 in any suitable fashion, e.g., stitching, bonding, and/or adhesive, etc. The tether 70, 72 may be of any suitable material, e.g., fabric, and may be of the same type of material as the airbag 16.

With reference to FIGS. 5 and 6, on each side of the vehicle seat 12, a front tether 70 is fixed to the vehicle-forward portion 62 and connected to the vehicle seat 12 and a rear tether 72 is fixed to the vehicle-rearward portion 60 and connected to the vehicle seat 12. The front tethers 70 are fixed to the vehicle-forward portion 62 and connected to the vehicle seat 12 with the occupant-seating areas 20 disposed therebetween. The rear tethers 72 position the vehicle-forward portion 62 of the airbag 16 vehicle-rearward of the occupant-seating areas 20 and spaced from the vehicle roof 22 below the vehicle roof 22.

The airbag 16 in the inflated position may be arced from the vehicle-forward portion 62 to the vehicle-rearward portion 60. In other words, the airbag 16 in the inflated position has an arc shape from the vehicle-forward portion 62 to the vehicle-rearward portion 60. As shown in FIGS. 5 and 6, the linear actuators 18 are at the top of the arc shape with the vehicle-forward portion 62 arcing vehicle 10 forward and downward from the linear actuator 18 and with the vehicle-rearward portion 60 arcing vehicle-rearward and downward from the linear actuator 18. The tethers 70, 72 maintain the arc shape of the airbag 16.

The tether retractor 74 is fixed to the seat, e.g., the seat frame 32, in any suitable way, e.g., threaded fastener, bracket, etc. The tether retractor 74 may be fixed to the seatback 14, e.g., the seatback frame 34. One tether retractor 74 is illustrated in the views of the Figures and in the example shown in the Figures the airbag assembly 40 includes two tether retractors 74, specifically, one on either side of the vehicle seat 12.

The tether retractor 74 is operatively connected to the tethers 70, 72 to retract the tethers 70, 72. The retraction of the tethers 70, 72 positions the airbag 16 to have the arc shape described above. The tether retractor 74 may be pyrotechnically activated. The tether retractor 74 may be, for example, any suitable type such as a rotary actuator in which the pyrotechnic charge rotates a shaft connected to the tethers 70, 72 such that the tethers 70, 72 wrap around the shaft; a piston linkage, in which the pyrotechnic charge for example, drives a piston attached to the tether; a ball-in-tube linkage in which an pyrotechnic charge propels a ball or balls over a cogwheel connected to the tether; or any other suitable type. The pyrotechnic charge is combustible to produce a gas. The pyrotechnic charge may be formed of a solid mixture of substances that, when ignited, react to produce the gas. For example, the pyrotechnic charge may be formed of sodium azide (NaNO3), potassium nitrate (KNO3), and silicon dioxide (SiO2), which react to form nitrogen gas (N2).

In examples including the tether retractor 74 and the lock 46, as shown in the example in the Figures, the tether retractor 74 and the lock 46 act against each other when the linear actuators 18 are in the deployed position. In the deployed position, the tether retractors 74 pull the vehicle-forward end and the vehicle-rearward end of the airbag 16 downwardly and the lock 46 maintains the rod 44 in the deployed position, i.e., preventing downward movement of the rod 44 relative to the base 42 against the force of the tether retractor 74.

Figure 8:
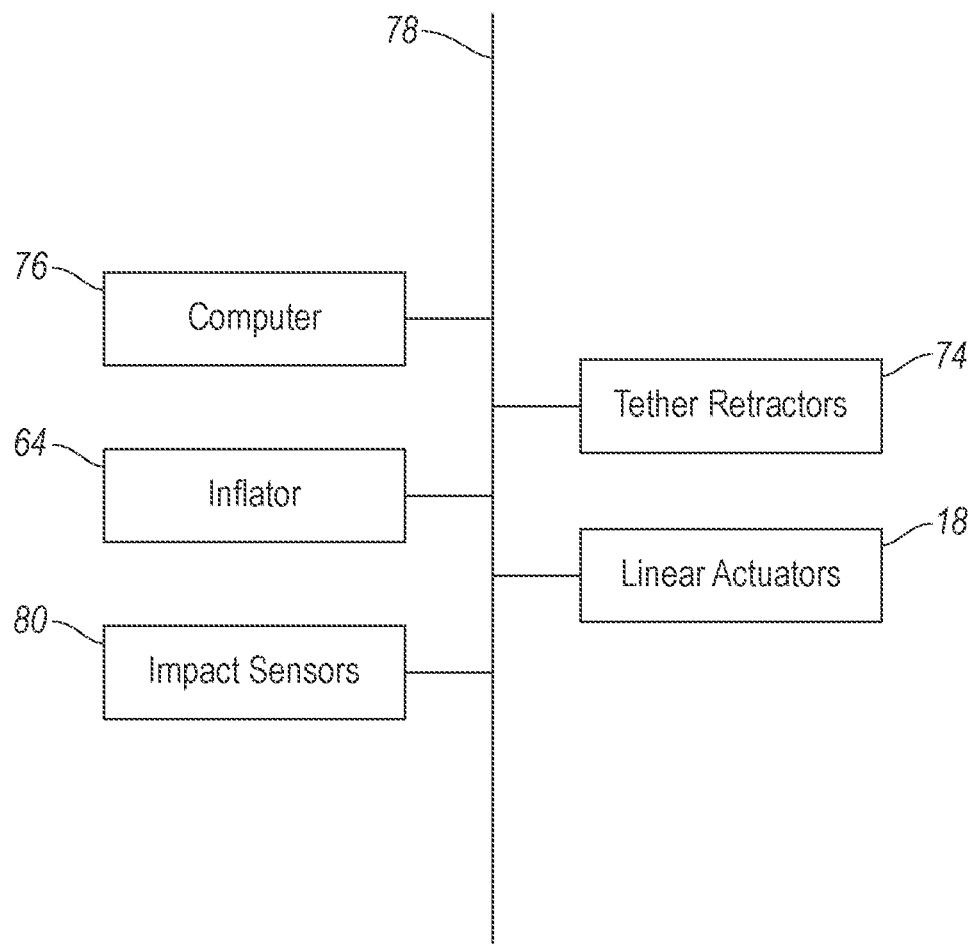
FIG. 8 is a block diagram of a system of the vehicle.

With reference to FIG. 8, the vehicle 10 includes a computer 76. The computer 76 includes a processor and a memory. The computer 76 may be a restraints control module. The memory includes one or more forms of computer readable media, and stores instructions executable by the computer 76 for performing various operations, including as disclosed herein and including, for example, a method of deploying the airbag assembly 40 as described herein. The computer 76 stores instructions to control components of the vehicle 10 including the linear actuators 18, the inflator 64, and the tether retractors 74. Use of "in response to," "based on," and "upon determining" herein indicates a causal relationship, not merely a temporal relationship.

For example, the computer 76 may be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the computer 76 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 76. The memory may be of any type, e.g., hard disk drives, solid state drives, servers, or any volatile or non-volatile media. The memory may store the collected data sent from the sensors. The memory may be a separate device from the computer 76, and the computer 76 may retrieve information stored by the memory via a vehicle communication network 78, e.g., over a CAN bus, a wireless network, etc. Alternatively or additionally, the memory may be part of the computer 76, e.g., as a memory of the computer 76.

As shown in FIG. 8, the computer 76 is generally arranged for communications on the vehicle 10 communication network that may include a bus in the vehicle 10 such as a controller area network CAN or the like, and/or other wired and/or wireless mechanisms. Alternatively or additionally, in cases where the computer 76 includes a plurality of devices, the vehicle communication network 78 may be used for communications between devices represented as the computer 76 in this disclosure. Further, as mentioned below, various controllers and/or sensors may provide data to the computer 76 via the vehicle 10 communication network 78.

The vehicle 10 may include at least one impact sensor 80 for sensing certain vehicle impacts (e.g., impacts of a certain magnitude, direction, etc.) and the computer 76 is in communication with the impact sensor 80, the linear actuators 18, the inflator 64, and the tether retractors 74. In response to detection of certain vehicle impacts, the computer 76 is programmed to activate the linear actuators 18 to raise the airbag 16 to the deployed position, activate the inflator 64 to inflate the airbag 16, and activate the tether retractors 74 to retract the tethers. As set forth above, the linear actuators 18, the inflator 64, and the tether retractors 74 may be pyrotechnically activated, in which case, the computer 76 activates the linear actuators 18, the inflator 64, and the tether retractors 74 by commanding activation of the pyrotechnic charge as described above, e.g., providing an impulse to a pyrotechnic charge. In response to detection of certain vehicle impact, the computer 76 may be programmed to first activate the linear actuators 18, and then activate the inflator 64 after a predetermined delay, and then activate the tether retractors 74 after another predetermined delay.

The impact sensor 80 may be configured to sense certain vehicle impacts prior to impact, i.e., pre-impact sensing. The impact sensor 80 may be in communication with the computer 76. The impact sensor 80 is configured to detect certain vehicle impacts. In other words, a "certain vehicle impact" is an impact of the type and/or magnitude for which inflation of the airbag 16 is designed i.e., "certain" indicates the type and/or magnitude of the impact. The type and/or magnitude of such "certain vehicle impacts" may be pre-stored in the computer 76, e.g., a restraints control module and/or a body control module. The impact sensor 80 may be of any suitable type, for example, post contact sensors such as accelerometers, pressure sensors, and contact switches; and pre-impact sensors 80 such as radar, LIDAR, and vision sensing systems. The vision sensing systems may include one or more cameras, CCD image sensors, CMOS image sensors, etc. The impact sensor 80 may be located at numerous points in or on the vehicle 10.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a vehicle seat having a seatback;
   an airbag inflatable from an uninflated position to an inflated position; a linear actuator fixed to the seatback and the airbag, the airbag being moveable by the linear actuator from an undeployed position upwardly away from the seatback to a deployed position, the linear actuator supporting the airbag on the seatback in the uninflated position and in the inflated position;
   the seat having an occupant-seating area and the airbag having a top chamber inflatable over the occupant-seating area; and
   a liftgate, the top chamber including a vehicle-rearward portion abutting the liftgate when the linear actuator is in the deployed position and the airbag is in the inflated position.

2. The vehicle as set forth in claim 1, wherein the linear actuator includes a base fixed to the seatback and a rod fixed to the airbag, the rod being slidably engaged with the base.

3. The vehicle as set forth in claim 2, wherein the linear actuator is pyrotechnically activated.

4. The vehicle as set forth in claim 2, wherein one of the base and the rod includes a bore and the other of the base and the rod is telescopically received in the bore.

5. The vehicle as set forth in claim 1, further comprising a second linear actuator spaced cross-vehicle from the linear actuator, the second linear actuator fixed to the seatback and the airbag, the airbag being moveable by the second linear actuator from an undeployed position upwardly away from the seatback to a deployed position, the second linear actuator supporting the airbag on the seatback in the uninflated position and in the inflated position.

6. The vehicle as set forth in claim 5, wherein the vehicle seat includes a first an occupant-seating area and a second occupant-seating area, the occupant-seating area and the second occupant-seating area being between the linear actuator and the second linear actuator along a cross-vehicle axis.

7. The vehicle as set forth in claim 1, wherein the airbag is at the seatback when the linear actuator is in the undeployed position and the airbag is spaced above an uppermost end of the seatback when the linear actuator is in the deployed position.

8. The vehicle as set forth in claim 1, further comprising a tether fixed to the vehicle-rearward portion and connected to the seat.

9. The vehicle as set forth in claim 1, further comprising a vehicle roof and the top chamber includes a vehicle-forward portion, the vehicle-forward portion extending downwardly and vehicle-forward from the vehicle-rearward portion to a forwardmost end spaced from the roof and vehicle-forward of the occupant-seating area.

10. The vehicle as set forth in claim 9, further comprising a tether fixed to the vehicle-forward portion and connected to the seat.

11. The vehicle as set forth in claim 9, further comprising a tether fixed to the vehicle-forward portion and connected to the seat and another tether fixed to the vehicle-rearward portion and connected to the seat.

12. The vehicle as set forth in claim 11, further comprising a tether retractor fixed to the seat and operatively connected to the tethers to retract the tethers.

13. The vehicle as set forth in claim 12, wherein the tether retractor is pyrotechnically activated.

14. The vehicle as set forth in claim 9, wherein the seatback is between the vehicle-forward portion and the vehicle-rearward portion of the airbag in the inflated position.

15. The vehicle as set forth in claim 1, wherein the airbag includes two side chambers inflatable downwardly from the top chamber on opposite sides of the occupant-seating area.

16. The vehicle as set forth in claim 1, further comprising an inflator fixed to the seatback and in fluid communication with the airbag.

17. The vehicle as set forth in claim 13, further comprising a fill tube from the inflator to the airbag.

18. A vehicle comprising:
a vehicle seat having a seatback;
an airbag inflatable from an uninflated position to an inflated position;
a linear actuator fixed to the seatback and the airbag, the airbag being moveable by the linear actuator from an undeployed position upwardly away from the seatback to a deployed position, the linear actuator supporting the airbag on the seatback in the uninflated position and in the inflated position;
an inflator fixed to the seatback and in fluid communication with the airbag; and
a fill tube from the inflator to the airbag.

19. The vehicle as set forth in claim 18, wherein the linear actuator includes a base fixed to the seatback and a rod fixed to the airbag, the rod being slidably engaged with the base.

20. The vehicle as set forth in claim 18, wherein the airbag is at the seatback when the linear actuator is in the undeployed position and the airbag is spaced above an uppermost end of the seatback when the linear actuator is in the deployed position.

\* \* \* \* \*